United States Patent
Fukagawa et al.

(10) Patent No.: US 10,593,079 B2
(45) Date of Patent: Mar. 17, 2020

(54) DISPLAY CONTROL DEVICE, DISPLAY SYSTEM, AND DISPLAY METHOD

(71) Applicant: Mitsubishi Electric Corporation, Tokyo (JP)

(72) Inventors: Hirofumi Fukagawa, Tokyo (JP); Kenichi Ogawa, Tokyo (JP); Tomohiro Yatagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/757,756

(22) PCT Filed: Feb. 10, 2016

(86) PCT No.: PCT/JP2016/053986
§ 371 (c)(1),
(2) Date: Mar. 6, 2018

(87) PCT Pub. No.: WO2017/138118
PCT Pub. Date: Aug. 17, 2017

(65) Prior Publication Data
US 2019/0035121 A1  Jan. 31, 2019

(51) Int. Cl.
*G06T 19/00* (2011.01)
*G06T 11/20* (2006.01)
*G06T 19/20* (2011.01)
*G09G 5/37* (2006.01)

(52) U.S. Cl.
CPC ............ *G06T 11/206* (2013.01); *G06T 19/00* (2013.01); *G06T 19/20* (2013.01); *G09G 5/37* (2013.01); *G06T 2219/004* (2013.01); *G06T 2219/2016* (2013.01); *G09G 2340/0492* (2013.01)

(58) Field of Classification Search
None
See application file for complete search history.

(56) References Cited

U.S. PATENT DOCUMENTS

| 6,907,579 B2* | 6/2005 | Chang ................... G06T 19/003 345/418 |
| 2014/0104266 A1* | 4/2014 | Stone ...................... G06F 17/50 345/419 |
| 2014/0333569 A1* | 11/2014 | Simmons .............. G06F 3/0418 345/174 |

FOREIGN PATENT DOCUMENTS

| JP | 11-85432 A | 3/1999 |
| JP | 2005-182125 A | 7/2005 |
| JP | 2009-199240 A | 9/2009 |

OTHER PUBLICATIONS

International Search Report issued in PCT/JP2016/053986 (PCT/ISA/210), dated Mar. 15, 2016.

* cited by examiner

*Primary Examiner* — Said Broome
(74) *Attorney, Agent, or Firm* — Birch, Stewart, Kolasch & Birch, LLP

(57) ABSTRACT

A side (107a) serving as a contour line (108) of a display space area (103) displayed on a two-dimensional screen (111), from among sides that configure boundary surfaces of the display space area (103), is extracted. Label information (105a) is drawn at a position adjacent to the extracted side (107a).

12 Claims, 10 Drawing Sheets

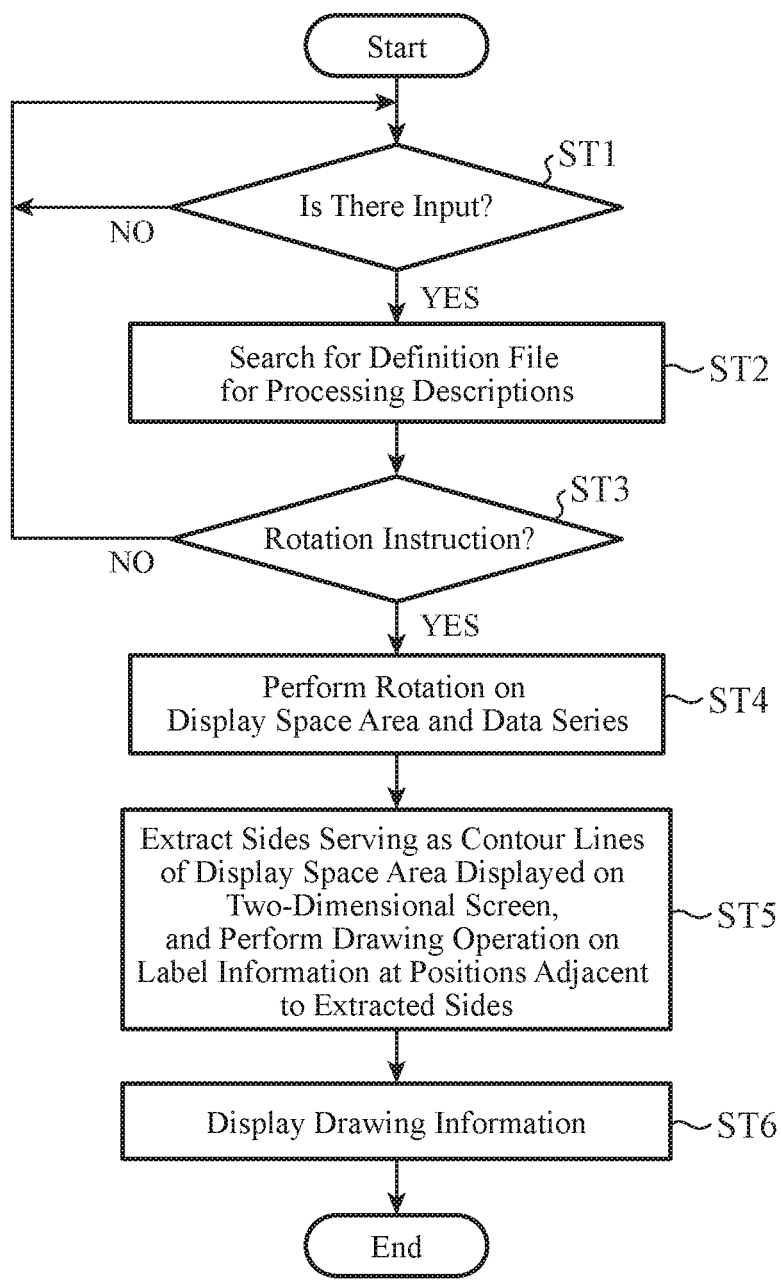

DISPLAY CONTROL DEVICE, DISPLAY SYSTEM, AND DISPLAY METHOD

TECHNICAL FIELD

The present invention relates to a display control device, a display system, and a display method for controlling display of a display object such as a data series of a graph in a three-dimensional coordinate space.

BACKGROUND ART

Conventionally, as means for grasping a tendency of data in a data series including three or more variables, systems for displaying a graph in a three-dimensional coordinate space have been proposed.

For example, Patent Literature 1 describes a display control device that rotates and displays a graph having a data series set in a three-dimensional coordinate space (hereinafter, the graph is referred to as three-dimensional graph) in accordance with a rotation operation. When the three-dimensional graph is rotated in an arbitrary direction in accordance with the rotation operation, a user can easily grasp an outline of the three-dimensional graph and the like.

Further, when label information such as a unit of data, a numerical value of a scale, or a name of a data series is displayed on axes (X, Y, Z) of a three-dimensional graph, the user can read values or meaning of the data in the three-dimensional graph while comparing the data with the axes.

As a method for displaying the label information, there is a method for displaying characters of the label information in a character style as viewed from the front without distortion on a constant basis, regardless of a display angle of the three-dimensional graph as viewed from the screen (hereinafter, the characters in a character style is described as front style).

However, in the above display method, even if the three-dimensional graph is rotated, the label information is not rotated to display the characters of the label information in the front style. Therefore, there is a problem that the user has a difficulty in distinguishing which part of the three-dimensional graph the label information is attached to or in grasping the sense of depth of the three-dimensional coordinate space.

Meanwhile, a window display device described in Patent Literature 2 performs, when rotating and displaying a window in a virtual space, perspective projection processing for a character string of the window in accordance with the rotation to provide a spatial depth. By application of this technology to display of label information of a three-dimensional graph, the sense of depth in the three-dimensional coordinate space is improved and the user can easily grasp the outline of the three-dimensional graph and an axis to which the label information is attached.

CITATION LIST

Patent Literatures

Patent Literature 1: Japanese Patent Application Publication No. 2005-182125.

Patent Literature 2: Japanese Patent Application Publication No. 1999(H11)-85432.

SUMMARY OF INVENTION

Technical Problem

The display control device described in Patent Literature 1 can display the three-dimensional graph at an arbitrary angle rotated by the rotation operation by the user.

However, there is a problem that the label information that is easy to see at a position rotated by a certain angle overlaps with the data series that configures the three-dimensional graph at a position rotated by another angle, and visibility is deteriorated.

Further, the display device described in Patent Literature 2 applies perspective projection processing to the characters of the label information to provide a spatial depth. However, there is a problem that the label information becomes unreadable depending on a position to which the label information is rotated. For example, as for the label information displayed on the screen in the front style as viewed from the user, when a plane on which the label information is drawn is rotated to become perpendicular to the screen, the user sees the non-thick plane on which the label information is drawn from a side and cannot see the characters of the label information.

The present invention has been made in order to solve the above problem, and an object thereof is to provide a display control device, display system, and display method which can improve the visibility of the label information.

Solution to Problem

A display control device according to the present invention includes an instruction processor and a drawing processor. The instruction processor instructs change of a display angle of a display space area that is a three-dimensional coordinate space in which a display object is displayed. The drawing processor rotates and draws the display space area and the display object on the basis of the instruction from the instruction processor, extracts a side serving as a contour line of the display space area displayed on a two-dimensional screen, of sides that configure boundary surfaces of the display space area, and draws and outputs label information at a position adjacent to the extracted side.

Advantageous Effects of Invention

According to the present invention, even when the display space area and the display object are rotated, the label information is drawn at the position adjacent to the side that serves the contour line of the display space area displayed on the two-dimensional screen.

As a result, the label information is always displayed near an outside of the display space area, and thus the visibility of the label information can be improved.

BRIEF DESCRIPTION OF DRAWINGS

FIG. 3 is a flowchart illustrating a specific example of an operation of the display control device according to the first embodiment.

DESCRIPTION OF EMBODIMENTS

Hereinafter, to describe the present invention in more detail, embodiments for implementing the present invention will be described with reference to the accompanying drawings.

First Embodiment

Figure 1:
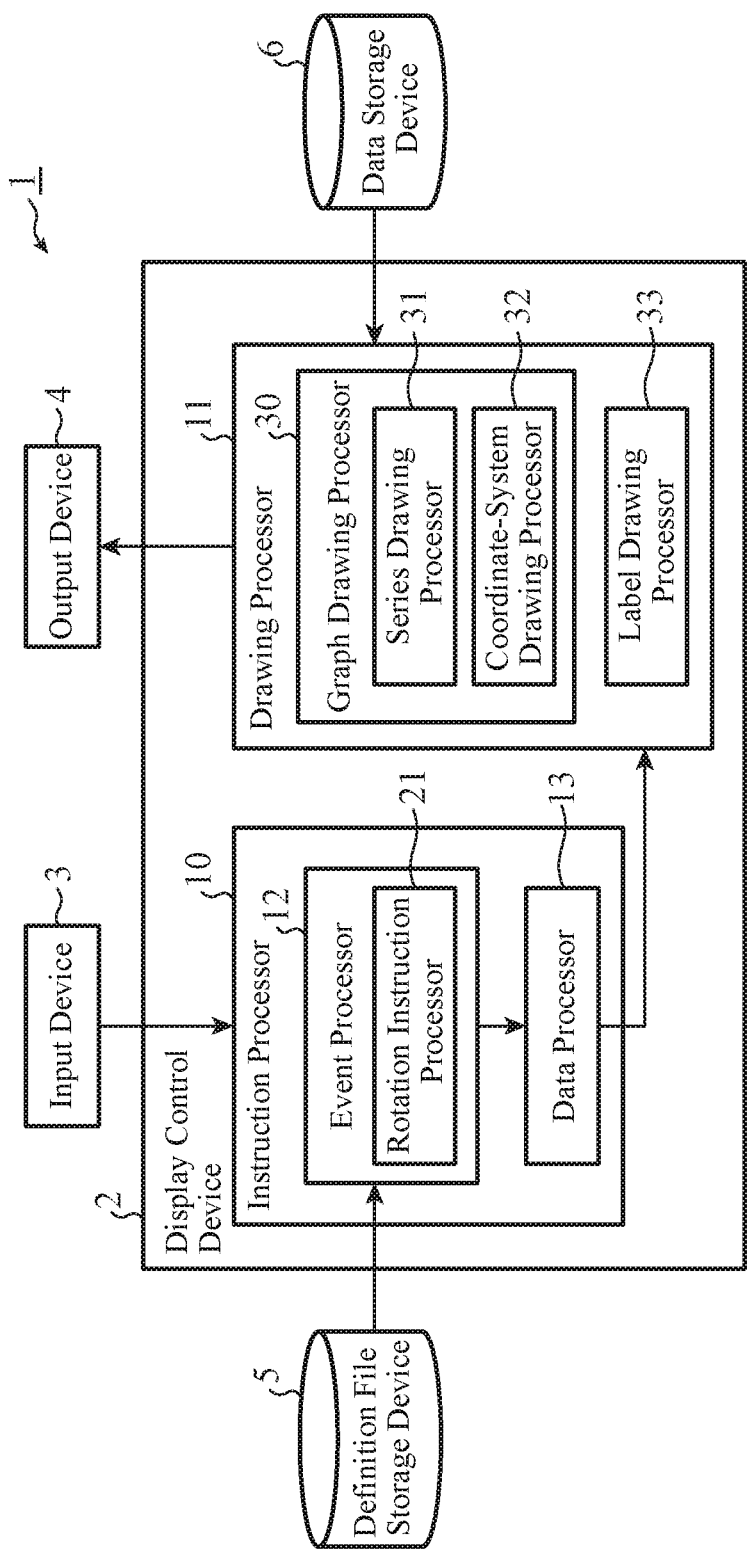
FIG. 1 is a block diagram illustrating a configuration of a display system according to a first embodiment of the present invention.

FIG. 1 is a block diagram illustrating a configuration of a display system 1 according to a first embodiment of the present invention.

The display system 1 is a system applied to an information processing apparatus such as a portable information terminal, an in-vehicle information device, or a personal computer, and includes a display control device 2, an input device 3, an output device 4, a definition file storage device 5, and a data storage device 6.

The display control device 2 is a device that controls information to be displayed on the output device 4, and includes an instruction processor 10 and a drawing processor 11.

The input device 3 is a device that receives an input operation by a user, and is configured from, for example, hardware such as a touch panel and a mouse, and software for inputting received information to the display control device 2.

The output device 4 is a device that displays drawing information input from the display control device 2 on a two-dimensional screen, and is realized by a liquid crystal display or the like. The drawing information is image information displayed on the two-dimensional screen of the output device 4.

The definition file storage device 5 is a device that stores a definition file for processing descriptions. Here, the definition file for processing descriptions is a file in which various operation details and processing details corresponding to the various operation details are registered. The data storage device 6 is a device that stores data for generating the drawing information. For example, a graph formula of a three-dimensional graph, a data series calculated with a graph expression, data defining a display range for displaying a data series, and the like are stored. Note that the definition file storage device 5 and the data storage device 6 may be integrated into one storage.

The instruction processor 10 is a processor that performs various instructions to the drawing processor 11, and includes an event processor 12 and a data processor 13.

The event processor 12 analyzes the processing details corresponding to the operation received by the input device 3 by reference to the definition file stored in the definition file storage device 5. Further, the event processor 12 includes a rotation instruction processor 21.

In a case where the operation received by the input device 3 corresponds to processing for changing a display angle of an image on the two-dimensional screen, the rotation instruction processor 21 analyzes the processing details according to details of the operation. For example, an image to be processed, a display angle after change, etc. are analyzed from the details of the operation.

The data processor 13 executes the processing of the details analyzed by the event processor 12.

For example, in a case where the details of the processing analyzed by the event processor 12 is processing for displaying a specific image on the two-dimensional screen, the data processor 13 requests the drawing processor 11 to output data necessary for drawing the image and draw the image.

Further, when the data processor 13 inputs the processing details analyzed by the rotation instruction processor 21, the data processor 13 instructs the drawing processor 11 to rotate the image on the two-dimensional screen so that the display angle becomes a changed display angle.

The drawing processor 11 is a processor that draws an image to be displayed on the two-dimensional screen on the basis of an instruction from the instruction processor 10, and includes a graph drawing processor 30 and a label drawing processor 33.

Further, the graph drawing processor 30 is a processor that draws a data series and a display space area of a three-dimensional graph, and includes a series drawing processor 31 and a coordinate system drawing processor 32.

Note that, hereinafter, the display space area in which the data series is displayed is appropriately described as three-dimensional graph.

The series drawing processor 31 is a processor that draws a data series that is a specific example of a display object in the present invention. For example, the series drawing processor 31 draws the data series of the display angle instructed by the instruction processor 10, using the data stored in the data storage device 6.

Further, the series drawing processor 31 draws the data series of the changed display angle if there is an instruction to change the display angle from the instruction processor 10.

The data series is a visualized aggregate of data calculated with a graph expression of a three-dimensional graph according to a form of the three-dimensional graph. For example, in a case where the form of the three-dimensional graph is a polygonal line graph, the series drawing processor 31 draws a polygonal line image in which plots of data calculated with the graph expression are connected by line segments.

The coordinate system drawing processor 32 draws the display space area of the display angle specified by the instruction processor 10, using the data stored in the data storage device 6.

Further, the coordinate system drawing processor 32 draws the display space area of the changed display angle in a case where there is the instruction to change the display angle from the instruction processor 10.

The display space area is a three-dimensional coordinate space in which a display object is displayed. For example, in a case where the display object is a data series, a coordinate space including coordinates corresponding to each data piece that configures the data series is the display space area.

The label drawing processor 33 draws label information to be added to the display space area, using the data stored in the data storage device 6. In particular, the label drawing processor 33 extracts a side that serves as a contour line of the display space area displayed on the two-dimensional screen, of sides that configure boundary surfaces of the display space area, and draws the label information at a position adjacent to the extracted side.

The label information is information of visualized labels regarding the display space area and the display object. For example, in a case where the display object is a data series, the label drawing processor 33 draws an image in which units of data on coordinate axes in the three-dimensional coordinate space, a numerical value of a scale, a name of the data series, and the like are described.

Figure 2A:
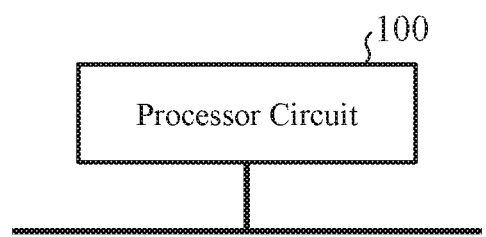
FIG. 2A is a block diagram illustrating a hardware configuration that realizes functions of a display control device according to the first embodiment.
Figure 2B:
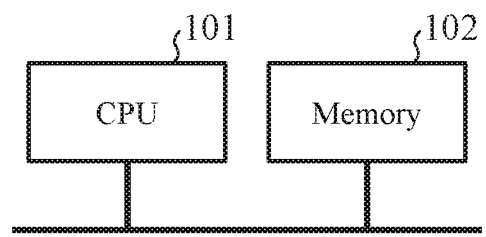
FIG. 2B is a block diagram illustrating a hardware configuration that executes software that realizes the functions of the display control device according to the first embodiment.

FIG. 2A is a block diagram illustrating a hardware configuration that realizes functions of the display control device 2 according to the first embodiment. Further, FIG. 2B is a block diagram illustrating a hardware configuration that executes software that realizes the functions of the display control device 2 according to the first embodiment.

The functions of the instruction processor 10 and the drawing processor 11 in the display control device 2 are realized by a processor circuit. That is, the display control device 2 includes the processor circuit for sequentially performing a step of instructing change of a display angle of a display space area in which a display object is displayed, and a step of rotating and drawing the display space area and the display object on the basis of the instruction, extracting a side serving as a contour line of the display space area displayed on a two-dimensional screen, of sides that configure boundary surfaces of the display space area, and drawing and outputting label information at a position adjacent to the extracted side.

The processor circuit may be dedicated hardware, or a central processing unit (CPU) or a graphic processing unit (GPU) that reads and executes a program stored in a memory.

In a case where the processor circuit is a dedicated hardware processor circuit 100 illustrated in FIG. 2A, the processor circuit 100 corresponds to, for example, a single circuit, a composite circuit, a programmed processor, a parallel programmed processor, an application specific integrated circuit (ASIC), a field-programmable gate array (FPGA), or a combination thereof.

Further, the functions of the units of the instruction processor 10 and the drawing processor 11 may each be realized by processor circuits, or the functions of the units may be collectively realized by one processor circuit.

In a case where the processor circuit is a CPU 101 illustrated in FIG. 2B, the functions of the instruction processor 10 and the drawing processor 11 are realized by software, firmware, or a combination of software and firmware.

The software and the firmware are described as programs and stored in a memory 102. The CPU 101 reads and executes the programs stored in the memory 102 to realize the functions of the units. That is, the display control device 2 includes the memory 102 for storing the programs that results in execution of the processing of the steps described above when the programs are executed by the CPU 101.

Further, these programs cause a computer to execute procedures or methods of the instruction processor 10 and the drawing processor 11.

Here, the memory corresponds to a nonvolatile or volatile semiconductor memory such as a random access memory (RAM), a ROM, a flash memory, an erasable programmable ROM (EPROM), an electrically EPROM (EEPROM), a magnetic disk, a flexible disk, an optical disk, a compact disk, a mini disk, a digital versatile disk (DVD), or the like.

A part of the functions of the instruction processor 10 and the drawing processor 11 may be realized by dedicated hardware and a part thereof may be realized by software or firmware.

For example, the functions of the instruction processor 10 are realized by the dedicated hardware processor circuit 100, and the functions of the drawing processor 11 are realized by the CPU 101 that executes the program stored in the memory 102. In this manner, the above-described processor circuit can realize the above-described functions by hardware, software, firmware or a combination thereof.

Next, an operation will be described.

FIG. 3 is a flowchart illustrating a specific example of an operation of the display control device 2 according to the first embodiment, and illustrates a series of processing for displaying an image on a two-dimensional screen in response to a rotation instruction.

Figure 4:
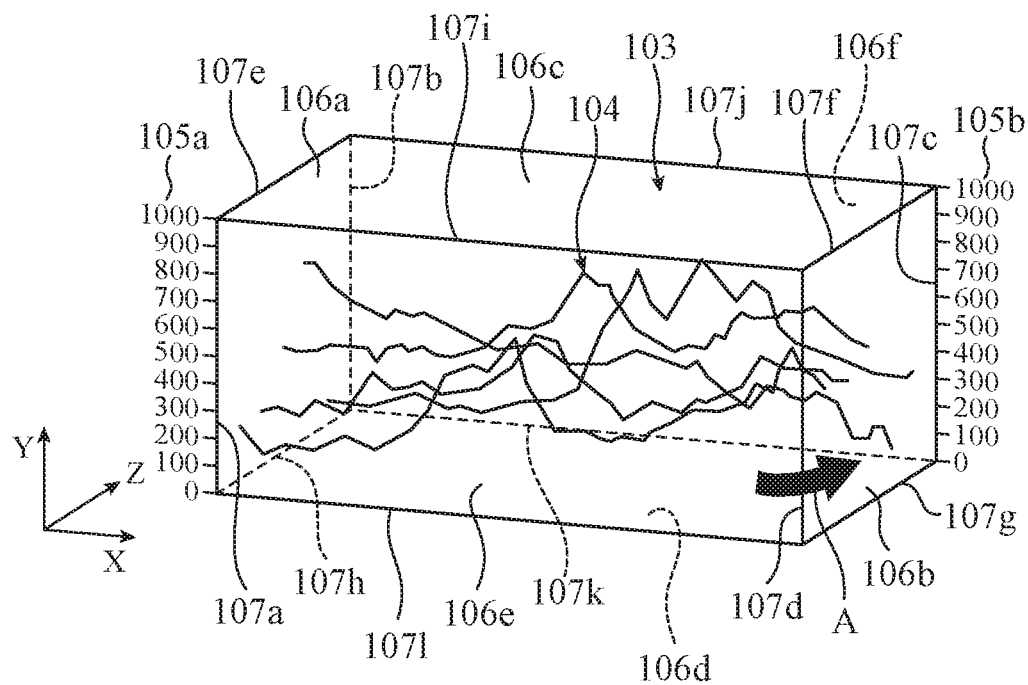
FIG. 4 is a diagram illustrating a display example of a three-dimensional graph in the first embodiment.

Hereinafter, the three-dimensional graph illustrated in FIG. 4 is displayed on the output device 4. This three-dimensional graph is configured from a display space area 103, a data series 104, label information 105a and label information 105b. The display space area 103 is a hexahedral space configured from boundary surfaces 106a to 106f parallel to coordinate planes of a three-dimensional coordinate system. The data series 104 is a data series of a trend graph obtained on the basis of the data stored in the data storage device 6. Further, the label information 105a and label information 105b are scale information displayed on a Y axis of the three-dimensional graph.

Further, the above-described step of instructing change of a display angle of the display space area 103 by the instruction processor 10 corresponds to the processing from step ST1 to step ST3 illustrated in FIG. 3.

The steps of rotating and drawing the display space area 103 and the data series 104 on the basis of the instruction from the instruction processor 10, extracting sides serving as the contour line of the display space area 103 displayed on the two-dimensional screen, from among sides that configure boundary surfaces of the display space area 103, and drawing the label information 105a and label information 105b at positions adjacent to the extracted sides for output, in a drawing processor 11, correspond to the processing from steps ST4 to ST6 as illustrated in FIG. 3.

Therefore, the operation by the display control device 2 will become apparent by describing the steps illustrated in FIG. 3. Therefore, hereinafter, description will be given on the basis of FIG. 3.

First, the event processor 12 confirms presence or absence of an input using the input device 3 on the basis of whether input operation information of the user has been input from the input device 3 (step ST1). When there is no input (step ST1; NO), the processing of step ST1 is repeated until the input is made.

When there is the input (step ST1; YES), the event processor 12 specifies a type of the operation from the input operation information of the user. Examples of the type of the operation include operations for the three-dimensional graph displayed on the output device 4, such as a touch operation and an operation of a software key with a mouse.

Next, the event processor 12 searches for a definition file related to the type of the operation, of the definition files for processing descriptions stored in the definition file storage device 5, on the basis of the specified type of the operation (step ST2). For example, in a case where the specified type of the operation is a touch operation, the event processor 12 searches for and reads out a definition file in which processing details related to the touch operation are registered from the definition file storage device 5.

Next, the event processor 12 specifies specific details of the operation from the input operation information of the user, and confirms whether the operation by the user is a rotation instruction by reference to the definition file on the basis of the specified details of the operation (step ST3).

In this case, to describe rotation processing of the three-dimensional graph displayed on the two-dimensional screen of the output device 4, the processing returns to step ST1 when the operation by the user is not the rotation instruction (step ST3; NO).

On the other hand, when the operation by the user is the rotation instruction (step ST3; YES), the rotation instruction processor 21 analyzes the details of the rotation processing of the three-dimensional graph displayed on the two-dimensional screen, from the details of the operation by the user. For example, information indicating the details of the rotation processing, such as the three-dimensional graph to be processed and the display angle of the three-dimensional graph to be changed by the rotation processing is analyzed. The information specified in this manner is output from the rotation instruction processor 21 to the data processor 13.

Next, the data processor 13 instructs the drawing processor 11 to change the display angle of the three-dimensional graph displayed on the output device 4, that is, the display angle of the display space area 103 in which the data series 104 is arranged, on the basis of the information indicating the processing details input from the rotation instruction processor 21.

For example, the data processor 13 calculates the display angle after the rotation processing of the display space area 103 in which the data series 104 is arranged, and outputs instruction information including the display angle to the drawing processor 11.

The graph drawing processor 30 rotates and draws the display space area 103 and the data series 104 to have the display angle instructed by the instruction processor 10 (step ST4).

For example, the series drawing processor 31 calculates coordinate data of the data series 104 of when the display angle is rotated to the display angle input from the data processor 13 on the basis of coordinate data of the data series 104 read from the data storage device 6. Next, the series drawing processor 31 draws the data series 104 after the display angle is changed, on the basis of the calculated coordinate data.

The coordinate system drawing processor 32 calculates coordinate data of the display space area 103 of when the display angle is rotated to the display angle input from the data processor 13, on the basis of coordinate data of the display space area 103 read from the data storage device 6. Next, the coordinate system drawing processor 32 draws the display space area 103 after the display angle is changed, on the basis of the calculated coordinate data.

Figure 5:
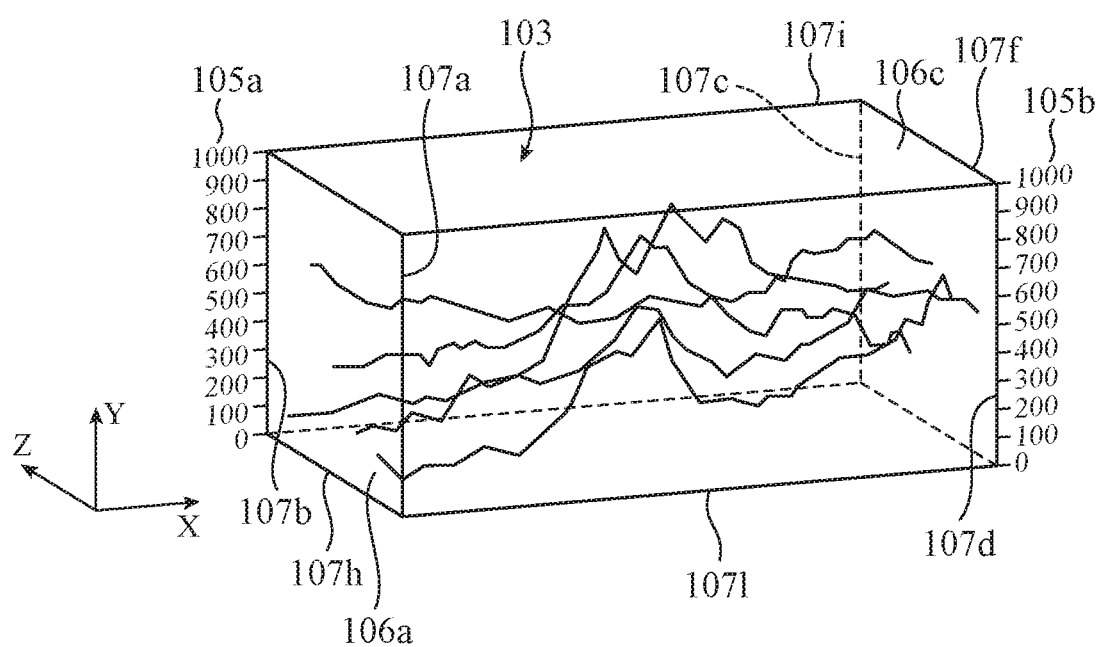
FIG. 5 is a diagram illustrating a display example of when the three-dimensional graph in FIG. 4 is rotated.

In the case of FIG. 4, the display space area 103 in which the data series 104 is arranged is rotated in a direction of an arrow A and about a central axis passing through the center of gravity of the display space area 103 and parallel to the Y axis, and the display space area 103 and the data series 104 illustrated in FIG. 5 are drawn.

Next, the label drawing processor 33 extracts sides serving as a contour line of the display space area 103 displayed on the two-dimensional screen, of sides 107*a* to 107*l* that configure the boundary surfaces 106*a* to 106*f* of the display space area 103, and draws the label information 105*a* and label information 105*b* at positions adjacent to the extracted sides (step ST5). Details of the drawing processing will be described below using FIGS. 6 and 7. The drawing information of the display space area 103, the data series 104, and the label information 105*a* and label information 105*b* that has been drawn at the display angle according to the rotation instruction is output from the drawing processor 11 to the output device 4. The output device 4 displays the drawing information input from the drawing processor 11 on the two-dimensional screen (step ST6).

Figure 6:
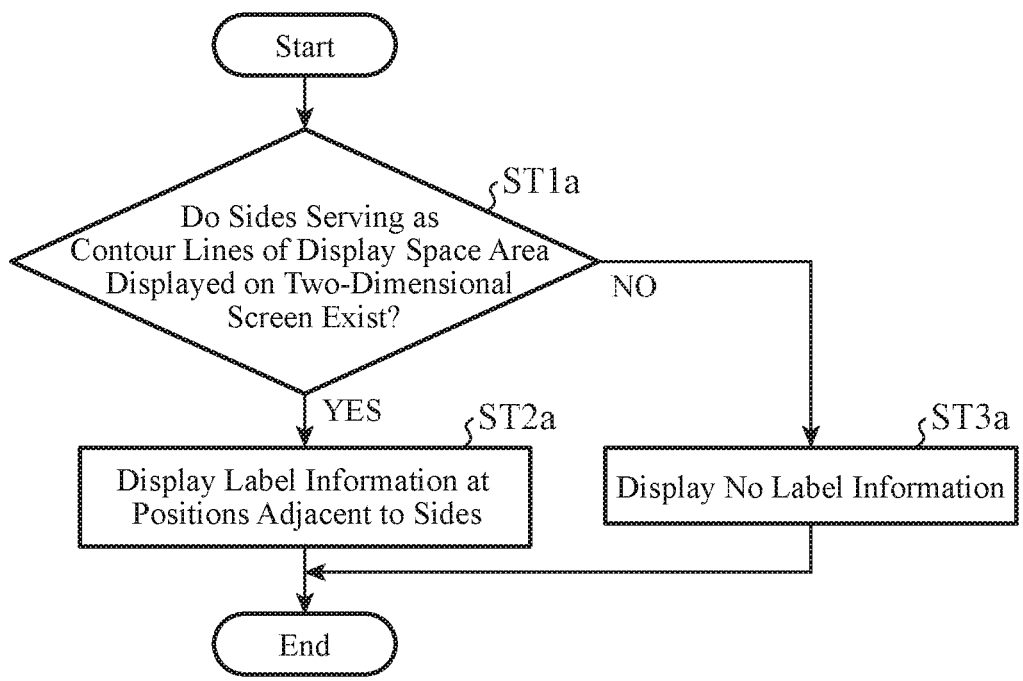
FIG. 6 is a flowchart illustrating a specific example of processing in step ST5 in FIG. 3.

FIG. 6 is a flowchart illustrating a specific example of the processing in step ST5 in FIG. 3.

Figure 7:
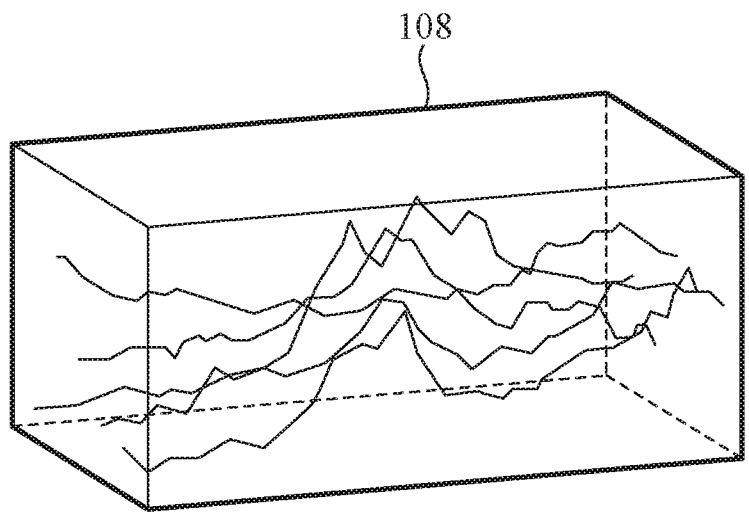
FIG. 7 is a diagram illustrating a contour line of a display space area displayed on a two-dimensional screen.

Further, FIG. 7 is a diagram illustrating a contour line 108 of the display space area 103 displayed on the two-dimensional screen, and illustrates the contour line 108 of the display space area 103 illustrated in FIG. 5.

The label drawing processor 33 confirms whether the sides 107*a* to 107*l* that configure the boundary surfaces 106*a* to 106*f* of the display space area 103 are sides that serve as the contour line of the display space area 103 displayed on the two-dimensional screen (step ST1*a*).

For example, in a case where the display space area 103 rotated in the direction of the arrow A illustrated in FIG. 4 is displayed on the two-dimensional screen as illustrated in FIG. 5, the boundary surface 106*a* parallel to a Y-Z coordinate plane becomes a surface on the side facing the user who views the two-dimensional screen, that is, a front-side surface. Further, the boundary surface 106*b* parallel to the Y-Z coordinate plane, which is the front side in FIG. 4, becomes a surface on a side away from the user who views the two-dimensional screen, that is, a back-side surface. The label drawing processor 33 extracts the boundary surfaces on the side facing the user from the display space area 103 after the display angle is changed, and employs the boundary surfaces as boundary surfaces that determine an external form of the display space area 103 displayed on the two-dimensional screen. Then, the label drawing processor 33 extracts sides that serve as the contour line 108 of the display space area 103, of the sides that configure the specified boundary surfaces.

In the case of FIG. 5, the label drawing processor 33 determines the boundary surfaces 106*a*, 106*c*, and 106*e* as the boundary surfaces that determine the external form of the display space area 103 displayed on the two-dimensional screen.

Then, the label drawing processor 33 extracts the sides 107*b*, 107*d*, 107*f*, 107*h*, 107*j*, and 107*l*, which serve as the contour line 108 of the display space area 103, of the sides that configure the aforementioned boundary surfaces.

Thereafter, the label drawing processor 33 confirms the details of the label information 105a and label information 105b to be drawn. As described above, the label information 105a and 105b are scale information added to the Y axis. Therefore, the label drawing processor 33 extracts the sides 107b and 107d parallel to the Y axis from among the extracted sides 107b, 107d, 107f, 107h, 107j, and 107l, as target sides at which the label information is drawn.

In a case where the sides extracted in this manner serve as the contour line 108 of the display space area 103 (step ST1a; YES), the label drawing processor 33 draws the label information at positions adjacent to the sides (step ST2a). As a result, the output device 4 displays the label information at the positions adjacent to the sides that serve as the contour line 108 of the display space area 103.

For example, in the case of FIG. 5, the label drawing processor 33 extracts the sides 107b and 107d that serve as the contour line 108 of the display space area 103, and draws the label information 105a and label information 105b at the positions adjacent to the sides 107b and 107d.

On the other hand, in a case where the sides do not configure the contour line 108 of the display space area 103 (step ST1a; NO), the label drawing processor 33 excludes the sides from the targets at which the label information is drawn (step ST3a). As a result, the output device 4 causes the label information not to be displayed on the sides.

For example, in the display space area 103 displayed on the two-dimensional screen as illustrated in FIG. 4, the sides 107a and 107c, of the sides that serve as the contour line, are the targets at which the label information 105a and label information 105b is drawn. From this display state, when the display space area 103 is rotated in the direction of the arrow A, the aforementioned display state becomes the display state illustrated in FIG. 5, and the sides 107a and 107c become not the sides that configure the contour line 108 of the display space area 103. Therefore, the sides 107a and 107c are excluded from the targets at which the label information 105a and label information 105b is drawn, and the label information is not displayed.

So far, the case in which the instruction processor 10 instructs the rotation processing of the three-dimensional graph in response to the input operation by the user has been described. However, the instruction processing may be automatically executed irrespective of the input operation by the user. For example, the instruction processor 10 instructs the drawing processor 11 to automatically rotate the three-dimensional graph under a predetermined condition even if there is no input operation by the user. The drawing processor 11 sequentially draws a three-dimensional graph with a changed display angle, in response to the instruction from the instruction processor 10. As a result, the output device 4 displays a three-dimensional graph that is automatically rotated.

In doing so, the user can easily visually recognize the depth of the display space area 103 that configures the three-dimensional graph, the relationship of the data series 104 before and after the rotation, and the like.

Further, in a case where two sides along the same coordinate axis in the three-dimensional coordinate space, of the sides that configure the boundary surfaces of the display space area 103, are the sides that configure the contour line 108 of the display space area 103, the label drawing processor 33 may extract one of the two sides.

For example, there are six sides that configure the contour line 108 of the display space area 103 illustrated in FIG. 7, and there are two sides each corresponding to each coordinate axis (the X axis, the Y axis, and the Z axis). Therefore, there is a possibility that display details overlap and the display state becomes complicated, if the label information is drawn on the two sides corresponding to each coordinate axis. Therefore, by limiting the target side at which the label information is drawn to one of the two sides corresponding to each coordinate axis, display without the above-described complication can be made.

Further, in a case where display information other than the label information is displayed at the positions where the label information 105a and label information 105b is drawn when the display space area 103 and the data series 104 are rotated, the label drawing processor 33 may exclude the positions from the targets at which the label information 105a and label information 105b is drawn.

For example, in a case where display information other than the label information, such as explanatory note, is displayed outside the display space area 103, the display positions of the label information 105a and label information 105b may overlap with the display position of the display information when the display space area 103 and the data series 104 are rotated. The label drawing processor 33 excludes the display positions from the targets at which the label information 105a and label information 105b is drawn, and preferentially draws the label information with the target side not overlapping with the display information. In doing so, display easily visually recognized by the user can be made.

Further, in a case where there are two sides that configure the boundary surface of the display space area 103 as one group of the sides that configure the contour line 108 of the display space area 103, there is a possibility of degradation of the visibility due to overlapping of the label information when the label information is drawn at the two sides.

Therefore, in a case where the two sides that configure the boundary surface of the display space area 103 overlap with each other as one group of the sides that configure the contour line 108 of the display space area 103, the label drawing processor 33 may select one of the two sides. With the selection, the degradation of the visibility due to overlapping display of the label information can be prevented.

As described above, the display control device 2 according to the first embodiment has the label information 105a and label information 105b drawn at the positions adjacent to the sides 107a and 107c that serve as the contour line 108 of the display space area 103 displayed on a two-dimensional screen 111, even when the display space area 103 and the data series 104 are rotated. With the configuration, the label information 105a and label information 105b is always displayed near outsides of the display space area 103. Therefore, the visibility of the label information 105a and label information 105b can be improved.

The display system 1 according to the first embodiment includes the instruction processor 10, the drawing processor 11, and the output device 4. With the configuration, a display system that can obtain effects similar to the above-described effects can be provided.

Second Embodiment

In a second embodiment, processing for determining a display angle of label information according to rotation of a three-dimensional graph will be described. Note that a display system according to the second embodiment has a configuration similar to the configuration illustrated in FIG. 1. However, a display control device according to the second embodiment performs an operation not described in the first embodiment. Therefore, hereinafter, the configuration of the display control device according to the second embodiment will be described with reference to FIG. 1.

Figure 8:
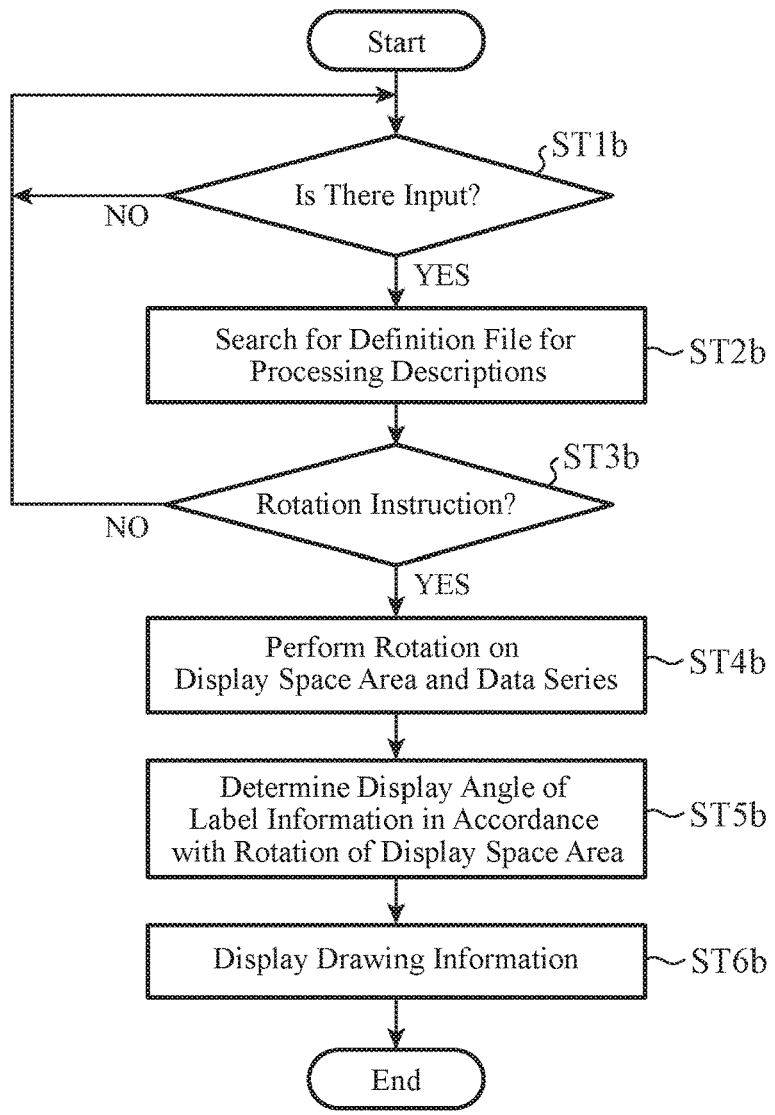
FIG. 8 is a flowchart illustrating a specific example of an operation of a display control device according to a second embodiment of the present invention.

FIG. 8 is a flowchart illustrating a specific example of an operation of a display control device 2 according to the second embodiment, and illustrates a series of processing for displaying an image on a two-dimensional screen in response to a rotation instruction. Note that steps ST1b to ST4b in FIG. 8 are similar to the processing from step ST1 to step ST4 illustrated in FIG. 3. Further, step ST6b is similar to the processing of step ST6 in FIG. 3. Therefore, description of the processing of these steps is omitted.

In step ST5b, a label drawing processor 33 determines display angles of label information 105a and label information 105b in accordance with the rotation of a display space area 103.

Figure 9:
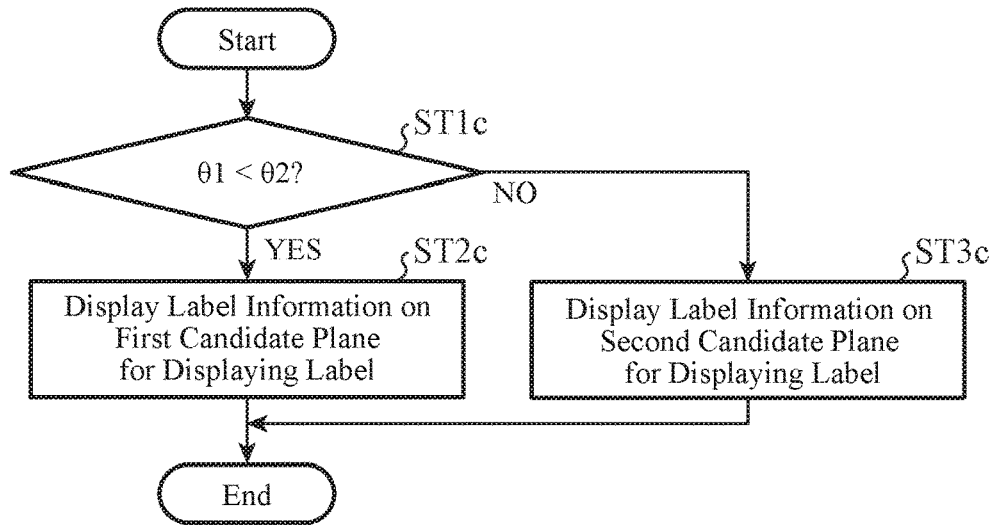
FIG. 9 is a flowchart illustrating a specific example of processing in step ST5b in FIG. 8.
Figure 10:
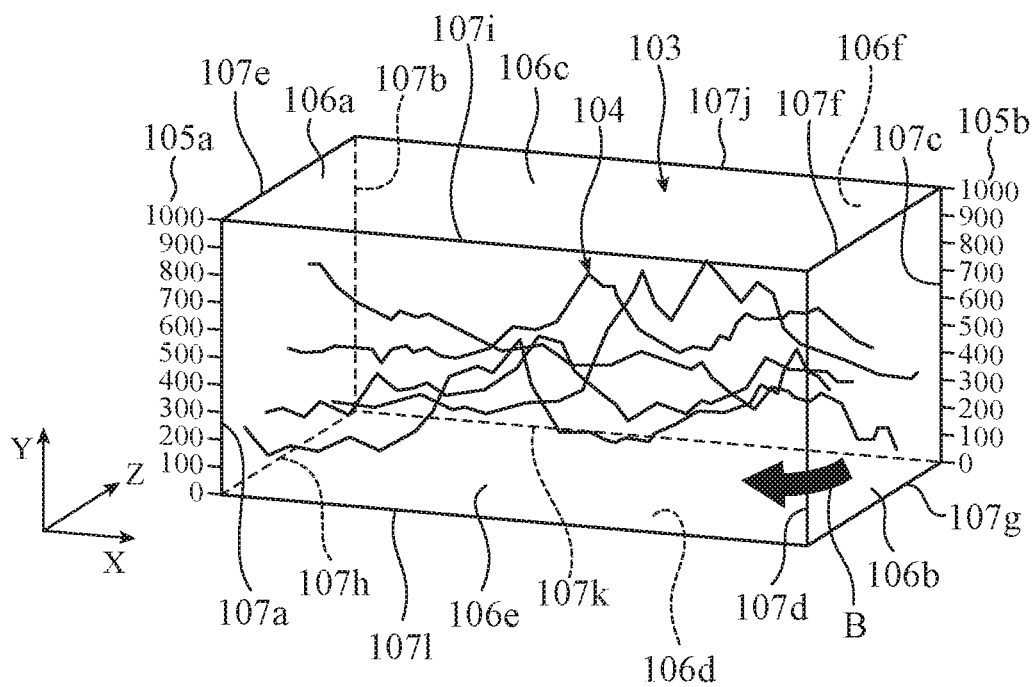
FIG. 10 is a diagram illustrating a display example of a three-dimensional graph in the second embodiment.
Figure 11:
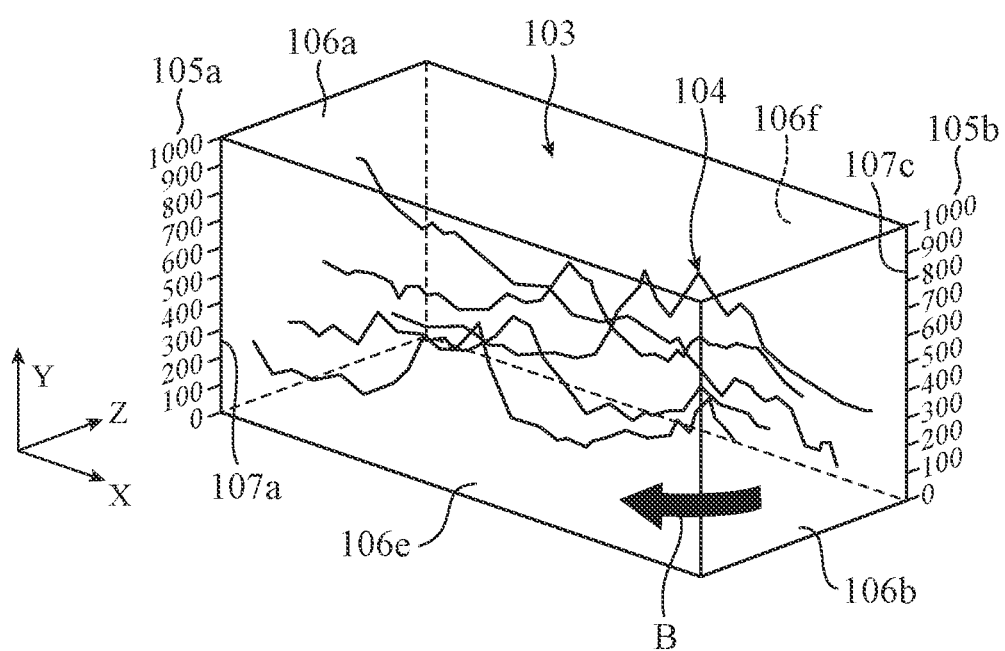
FIG. 11 is a diagram illustrating a display example of when the three-dimensional graph in FIG. 10 is rotated.
Figure 12:
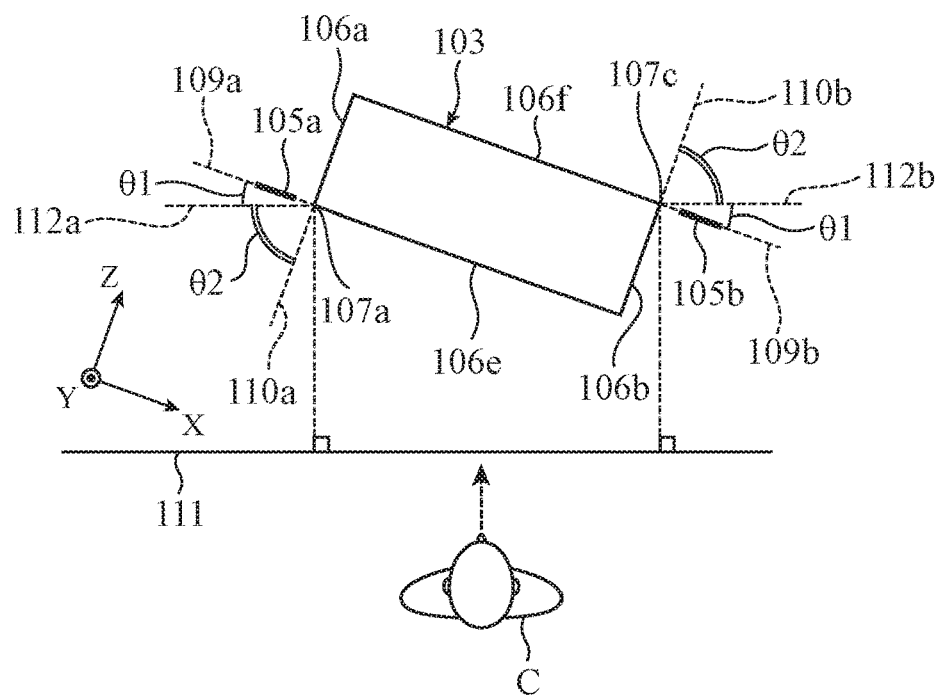
FIG. 12 is a diagram illustrating a state of the three-dimensional graph in FIG. 10 as viewed in a Y axis direction.
Figure 13:
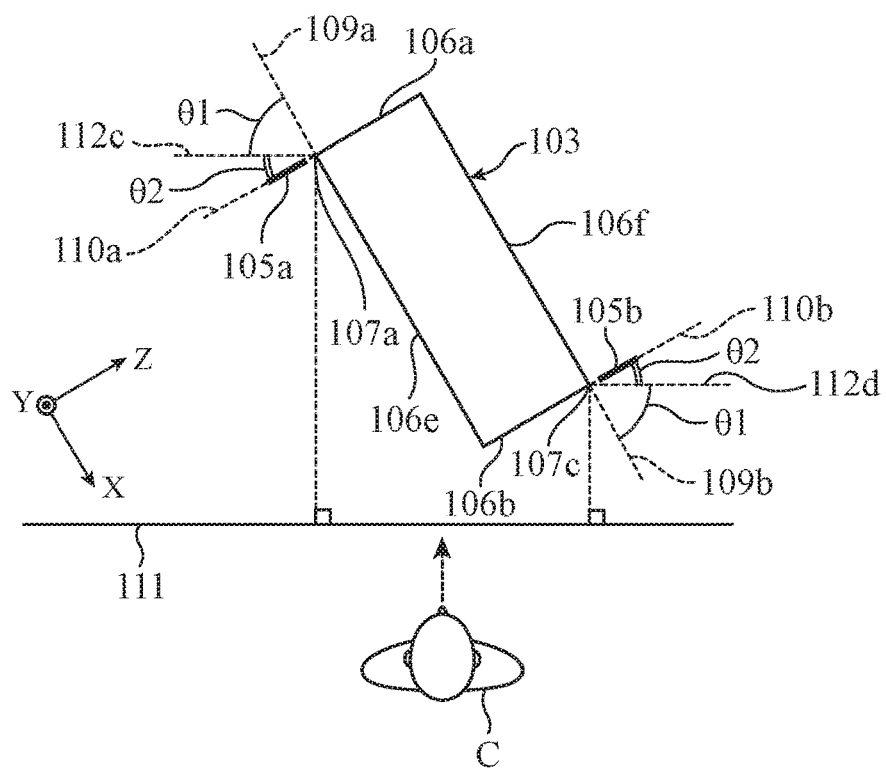
FIG. 13 is a diagram illustrating a state of the three-dimensional graph in FIG. 11 as viewed in the Y axis direction.

FIG. 9 is a flowchart illustrating a specific example of the processing in step ST5b in FIG. 8. Further, FIG. 10 is a diagram illustrating a display example of a three-dimensional graph on a two-dimensional screen. FIG. 11 is a diagram illustrating a display example of when the three-dimensional graph in FIG. 10 is rotated, and illustrates a state in which the three-dimensional graph in FIG. 10 is rotated in a direction of an arrow B and about a central axis passing through the center of gravity of the display space area 103 and parallel to a Y axis. FIG. 12 is a diagram illustrating a state of the three-dimensional graph in FIG. 10 as viewed in the Y axis direction. FIG. 13 is a diagram illustrating a state of the three-dimensional graph in FIG. 11 as viewed in the Y axis direction.

As illustrated in FIG. 10, the label information 105a and label information 105b are drawn on label display planes 109a and 109b. The label display planes 109a and 109b are planes obtained by extending boundary surfaces 106e and 106f of the display space area 103 to an outside of the display space area 103 from sides 107a and 107c extracted as sides that serve as a contour line 108 illustrated in the first embodiment.

With the display in this manner, the label information 105a and label information 105b can be displayed in a direction according to the display angle of the display space area 103, and visibility from a user C can be improved.

Further, a display angle θ1 of the label information 105a and label information 105b illustrated in FIG. 12 is an angle made by the label display planes 109a and 109b with respect to reference planes 112a and 112b parallel to the two-dimensional screen 111 and including the extracted sides 107a and 107c.

In a case where the display space area 103 is rotated in the direction of the arrow B illustrated in FIG. 10, the boundary surface 106b becomes a surface facing the user C who views the two-dimensional screen 111.

In this case, the label display planes 109a and 109b on which the label information 105a and label information 105b are displayed in the display state in FIG. 12 become candidate planes for displaying labels after the display space area 103 is rotated. Here, these candidate planes for displaying labels are called first candidate planes for displaying labels.

Further, the label drawing processor 33 specifies a boundary surface 106b and a boundary surface 106a facing the boundary surface 106b, and specifies planes obtained by extending the boundary surfaces 106a and 106b to the outside of the display space area 103 from the extracted sides 107a and 107c, as label display planes 110a and 110b.

These candidate planes for displaying labels are called as second candidate planes for displaying labels.

Note that an angle θ2 is an angle made by the label display planes 110a and 110b with respect to the reference planes 112a and 112b. In a case where the label information 105a and label information 105b are drawn on the label display planes 110a and 110b, the angle θ2 becomes the display angle of the label information 105a and 105b.

In a case where the display space area 103 is rotated in the direction of the arrow B in FIG. 10, the label drawing processor 33 confirms whether the angle θ1 is smaller than the angle θ2 (step ST1c).

Note that when the display space area 103 is rotated in this manner, reference planes 112c and 112d illustrated in FIG. 13 become planes parallel to the two-dimensional screen 111 and including the extracted sides 107a and 107c. Further, the angles θ1 and θ2 are angles made by the candidate planes for displaying labels with respect to the reference planes 112c and 112d. Since θ1+θ2 is 90 degrees, the label display plane is switched when both θ1 and θ2 are 45 degrees as the boundary.

In a case where the angle θ1 is smaller than the angle θ2 (step ST1c; YES), the label drawing processor 33 determines that the angle θ1 is a shallower angle than the angle θ2 with respect to the reference planes 112c and 112d. In this case, since the first candidate plane for displaying labels has a larger display area facing the user C, the label drawing processor 33 draws the label information 105a and label information 105b on the first candidate planes for displaying labels (step ST2c). As a result, the output device 4 displays, on the two-dimensional screen 111, the three-dimensional graph having the label information 105a and label information 105b drawn on the label display planes 109a and 109b.

On the other hand, in a case where the angle θ2 is the angle θ1 or less, that is, θ2≤45 degrees (step ST1c; NO), the label drawing processor 33 determines that the angle θ2 is the same as the angle θ1, or the angle θ2 is a shallower angle than the angle θ1, with respect to the reference planes 112c and 112d.

In this case, since the second candidate planes for displaying labels have a larger display area facing the user C, the label drawing processor 33 draws the label information 105a and label information 105b on the second candidate planes for displaying labels (step ST3c). As a result, an output device 4 displays, on the two-dimensional screen 111, a three-dimensional graph having the label information 105a and label information 105b drawn on the label display planes 110a and 110b illustrated in FIG. 13. With the display, the three-dimensional graph is displayed as illustrated in FIG. 11.

By switching the label display plane on which the label information is drawn according to the magnitude of the angles θ1 and θ2, the label information can be prevented from being illegibly crushed due to the rotation operation of the three-dimensional graph. As a result, the visibility of the label information can be secured on a constant basis.

Note that, similarly to the first embodiment, the instruction processor 10 may instruct the drawing processor 11 to automatically rotate the three-dimensional graph under a predetermined condition even if there is no input operation by the user. In this case, the label display plane on which the label information is drawn and the display angle of the label information are determined as described above.

Further, the case in which the planes obtained by extending the boundary surfaces 106e and 106f of the display space area 103 to the outside of the display space area 103 from the sides 107a and 107c extracted as the sides serving as the contour line 108 is employed as the label display planes. However, planes other than the aforementioned planes may be employed as the label display planes.

For example, sides not including the sides 107a and 107c extracted as the sides serving as the contour line 108 may be employed as long as the planes are parallel to the boundary surfaces 106e and 106f of the display space area 103. An inside of the display space area 103 may be employed as a target in which the label information is drawn.

In a case where there is explanatory note or the like outside the display space area 103, a plane parallel to the boundary surface with respect to a display position of the explanatory note can be employed as the label display plane, and the display angle can be switched.

Note that the label information also includes the explanatory note and other supplementary information, and the display angle can be switched by a similar method.

So far, the method for switching the label display plane at θ1=θ2=45 degrees as the boundary has been described. However, the label display plane may be switched at another arbitrary angle.

For example, the boundary to switch the label display planes 109a and 109b to the label display planes 110a and 110b is set to θ1=90° (θ2=0 degrees).

When the label display planes 109a and 109b become orthogonal to the two-dimensional screen 111 due to the rotation of the display space area 103, the label drawing processor 33 excludes the label display planes 109a and 109b from the targets on which the label information 105a and label information 105b are drawn.

With the exclusion, the frequency to switch the label display planes 109a and 109b to the label display planes 110a and 110b can be minimized while the label information 105a and label information 105b are avoided from being completely displayed as crushed.

This is effective when the display angle of the data series 104 and the display angles of the label information 105a and label information 105b are stable with respect to each other as much as possible, like the data series 104 of the trend graph, to provide a graph that can be easily viewed by the user. For example, in a case where the display angle of the data series 104 is different from the display angles of the label information 105a and label information 105b, recognition of which coordinate values of the data series 104 the label information 105a and 105b indicate is difficult.

As described above, in the display control device 2 according to the second embodiment, the drawing processor 11 draws the label information on the plane that is the label display plane obtained by extending the boundary surface of the display space area 103 to the outside of the display space area 103 from the extracted side. With the configuration, the label information can be displayed in the direction corresponding to the display angle of the display space area 103, and the visibility from the user can be improved.

Further, in the display control device 2 according to the second embodiment, the drawing processor 11 determines the target on which the label information is drawn, from among a plurality of the label display planes, on the basis of the angle made by the label display plane with respect to the reference plane parallel to the two-dimensional screen 111 and including the extracted sides.

With the configuration, the label display plane having a large display area and facing the user C can be determined as the drawing target, and the visibility of the label information is improved.

Further, in the display control device 2 according to the second embodiment, the drawing processor 11 excludes the label display planes orthogonal to the two-dimensional screen 111 from the targets on which the label information 105a and label information 105b are drawn. With the configuration, the label information 105a and label information 105b can be prevented from being completely crushed as viewed from the user C.

Third Embodiment

In a third embodiment, processing for determining a more appropriate display angle of label information according to a display angle of the label information after rotation will be described. Note that a display system according to the third embodiment has a configuration similar to the configuration illustrated in FIG. 1.

However, a display control device according to the third embodiment performs an operation not described in the first and second embodiments.

Therefore, hereinafter, the configuration of the display control device according to the third embodiment will be described with reference to FIG. 1.

Figure 14:
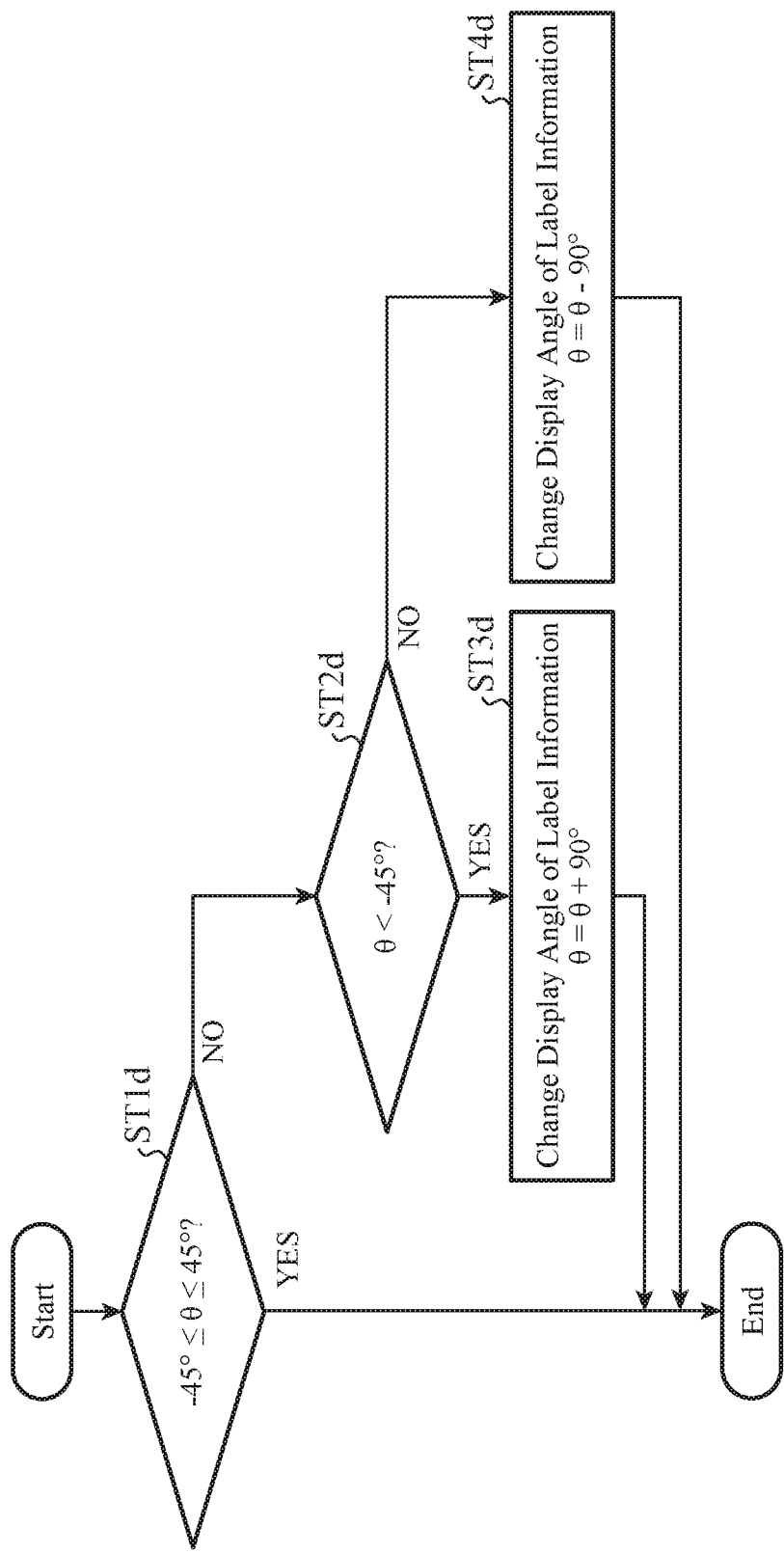
FIG. 14 is a flowchart illustrating a specific example of an operation of a display control device according to a third embodiment of the present invention.
Figure 15:
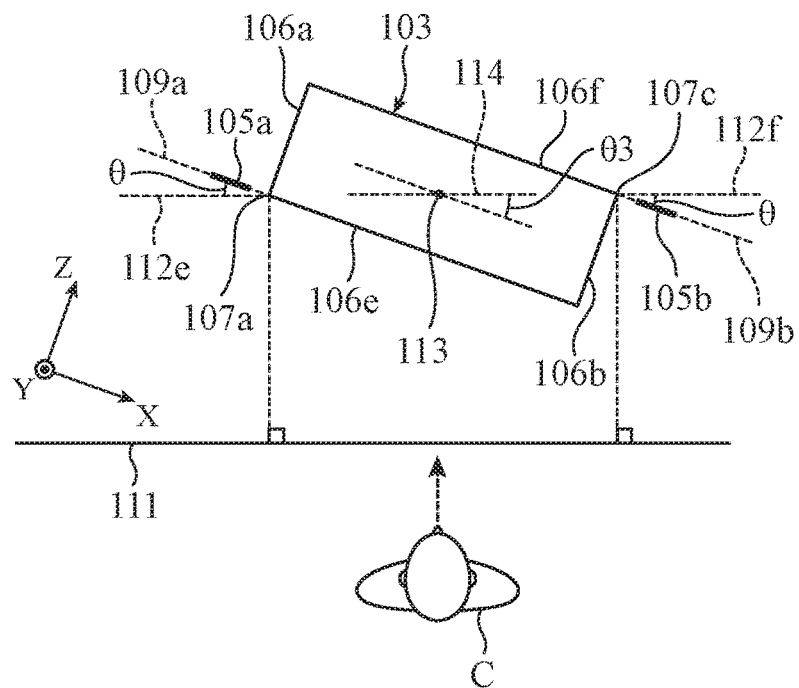
FIG. 15 is a diagram illustrating a state of a display space area in the third embodiment as viewed in a Y-axis direction.

FIG. 14 is a flowchart illustrating a specific example of an operation of a display control device 2 according to the third embodiment of the present invention, and illustrates a specific example of processing executed in place of the processing in step ST5b in FIG. 8. FIG. 15 is a diagram illustrating a state of a display space area 103, label information 105a and label information 105b in the third embodiment as viewed in a Y axis direction. Further, FIG. 16 is a diagram illustrating a state in which the display space area 103 in FIG. 15 is rotated about a central axis 113 passing through the center of gravity of the display space area 103 and parallel to the Y axis.

Display angles θ of the label information 105a and label information 105b illustrated in FIG. 15 are angles made by the label display planes 109a and 109b described in the second embodiment with respect to the reference planes 112e and 112f parallel to the two-dimensional screen 111 and including the extracted sides 107a and 107c.

Figure 16:
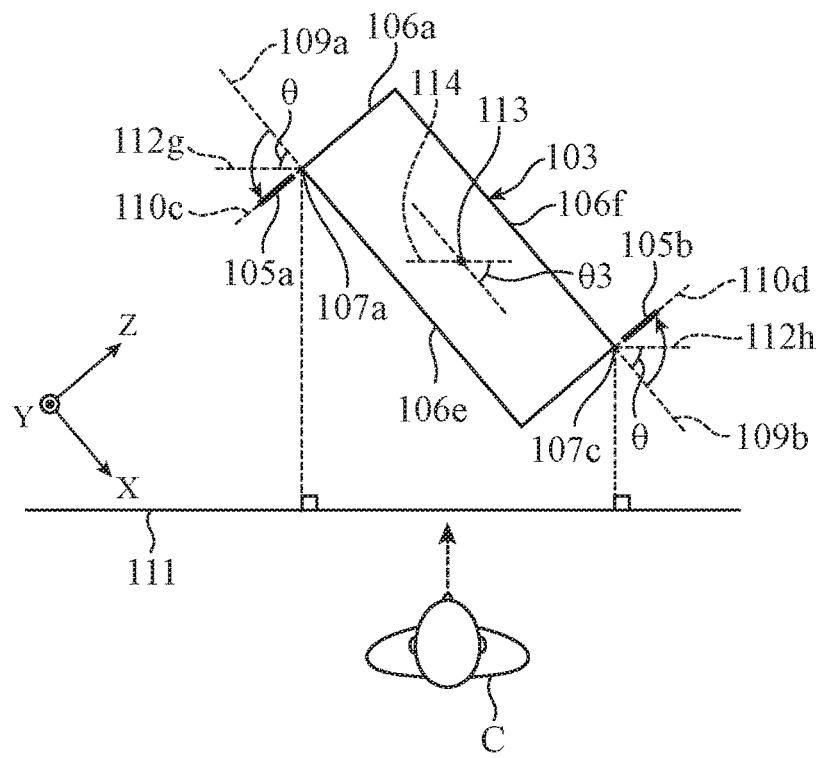
FIG. 16 is a diagram illustrating a state in which the display space area in FIG. 15 is rotated.

Further, display angles θ of the label information 105a and label information 105b illustrated in FIG. 16 are angles made by the label display planes 109a and 109b with respect to the reference planes 112g and 112h parallel to the two-dimensional screen 111 and including the extracted sides 107a and 107c.

Further, an angle θ3 is an angle made by the display space area 103 with respect to a reference plane 114 parallel to the two-dimensional screen 111 and including the central axis 113.

Note that, in FIGS. 15 and 16, $-180° \le θ3 \le 180°$.

FIG. 14 illustrates processing on the assumption of $-90° \le θ3 \le 90°$.

First, a label drawing processor 33 determines whether the display angles θ of the label information 105a and label information 105b satisfy $-45° \le θ \le 45°$ (step ST1d).

When $-45° \le θ \le 45°$ (step ST1d; YES), the label drawing processor 33 terminates the processing without changing the display angles θ of the label information 105a and label information 105b.

When $-45° \le θ \le 45°$ is not established (step ST1d; NO), the label drawing processor 33 determines whether the display angles θ of the label information 105a and label information 105b satisfy $θ < -45°$ (step ST2d).

When the display angle θ satisfies $θ < -45°$ (step ST2d; YES), the label drawing processor 33 rotates the label display planes 109a and 109b about the extracted sides by 90 degrees so that the display angle θ becomes θ=θ+90° (Step ST3d).

Meanwhile, when the display angles θ of the label information 105a and label information 105b satisfy θ<−45° or 45°<θ (step ST2d; NO), the label drawing processor 33 rotates the label display planes 109a and 109b about the extracted sides by −90 degrees so that the display angle θ becomes θ=θ−90° (step ST4d).

Note that FIG. 16 corresponds to a case in which the display angles θ of the label information 105a and label information 105b become θ<−45° by rotating the display space area 103 about the central axis 113.

In this case, the label display planes 109a and 109b are rotated so that the display angles of the label information 105a and label information 105b become θ=θ+90 degrees, and the label information 105a and label information 105b are drawn on the label display planes 110a and 110b.

As a result, the two-dimensional screen 111 viewed from a user C is changed from the state before the change of the display angle θ illustrated in FIG. 15 to the state after the change of the display angle θ illustrated in FIG. 16. That is, the display angles θ of the label information 105a and label information 105b are changed by 90 degrees.

Therefore, the label display plane is switched to the label display plane facing the user C and having a large display area, and the visibility of the label information 105a and label information 105b can be improved.

So far, the case of −90°≤θ3≤90° has been described. However, in cases of −180°≤θ3<−90° and 90°<θ3≤180°, the label drawing processor 33 determines whether the display angle θ is any one of −225°≤θ≤135°, −45°≤θ≤45°, and 135°≤θ≤225° in step ST1d. Further, in step ST2d, whether the display angle θ is either 0<−225° or 45°<θ<135° is determined. In this way, effects similar to the above can be obtained.

Further, in a case where the displayed dimensions of the label information 105a and label information 105b fall outside a predetermined aspect ratio when the display space area 103 and the data series 104 are rotated, the label information may be drawn after the label display plane is rotated about the extracted sides, thereby to cause the displayed dimensions to have the predetermined aspect ratio.

For example, in a case where the aspect ratio of the displayed dimensions of the label information 105a and label information 105b of when the label display planes become parallel to the two-dimensional screen 111 is 1:1, the display angles of the label information 105a and label information 105b are changed by 90° when the aspect ratio becomes 1:(x<0.5) due to the rotation of the display space area 103. In this way, effects similar to the above can be obtained.

As described above, in the display control device 2 according to the third embodiment, the label drawing processor 33 draws the label information after rotating the label display plane about the extracted side by a predetermined angle, in a case where the angle made by the label display plane with respect to the reference plane falls outside a predetermined range when the display space area 103 and the data series 104 are rotated.

With the configuration, the label display plane is switched to the label display plane facing the user C and having a large area, and the visibility of the label information 105a and label information 105b can be improved.

Further, in the display control device 2 according to the third embodiment, in a case where the displayed dimension of the label information falls outside the predetermined aspect ratio when the display space area 103 and the data series 104 are rotated, the label drawing processor 33 draws the label information after rotating the label display plane about the extracted side, thereby to cause the displayed dimension to have the aspect ratio.

With the configuration, the label display plane is switched to the label display plane facing the user C and having a large area, and the visibility of the label information 105a and label information 105b can be improved.

In the first to third embodiments, the cases in which the input device 3 is a pointing device such as a mouse or a touch panel have been described. However, the present invention is not limited to these cases.

For example, the input device 3 may be a keyboard that instructs numerical values, directions, and the like, or may perform a gesture input by analysis of a captured image, a sound input using speech recognition, or the like.

In the first to third embodiments, the cases in which the three-dimensional graph is a trend graph expressed by continuous polygonal lines have been described. However, a bar graph, a scatter diagram, or the like drawn in the display space area 103 may be employed. Further, similar effects can be obtained as long as supplementary information such as characters is displayed in the display space area 103, such as map information.

In the first to third embodiments, the method for determining the display angle of the label information displayed on the Y axis has been described. However, similar processing to the first to third embodiments can be applied to the label information displayed on the X axis and the Z axis. For example, the display angle of the label information displayed on the X axis can be determined by a similar method, even in a case where the display space area 103 is rotated about a central axis passing through the center of gravity of the display space area 103 and parallel to the X axis.

Note that, within the scope of the invention, it is possible to freely combine the embodiments, modify any components in the embodiments, or omit any components in the embodiments.

INDUSTRIAL APPLICABILITY

The display control device according to the present invention can improve the visibility of the label information regarding the display object, and is thus favorable for a portable information terminal, an in-vehicle information device, a personal computer or the like, capable of rotating and displaying the display object, using the input device such as a touch panel.

REFERENCE SIGNS LIST

1: Display system; 2: Display control device; 3: Input device; 4: Output device; 5: Definition file storage device; 6: Data storage device; 10: Instruction processor; 11: Drawing processor; 12: Event processor; 13: Data processor; 21: Rotation instruction processor; 30: Graph drawing processor; 31: Series drawing processor; 32: Coordinate system drawing processor; 33: Label drawing processor; 100: Processor circuit; 101: CPU; 102: Memory; 103: Display space area; 104: Data series; 105a: Label information; 105b: Label information; 106a to 106f: Boundary surfaces; 107a to 107l: Sides; 108: Contour line; 109a, 109b, 110a, 110b: Label display planes; 111: Two-dimensional screen; 112a to 112h, 114: Reference planes; and 113: Central axis.

The invention claimed is:

1. A display control device comprising:
an instruction processor to provide an instruction for change of a display angle of a display space area that is a three-dimensional coordinate space in which a display object is displayed; and
a drawing processor to rotate and draw the display space area and the display object on a basis of the instruction received from the instruction processor, extract a side serving as a contour line of the rotated display space area displayed on a two-dimensional screen, from among sides that configure boundary surfaces of the rotated display space area, and draw label information at a position adjacent to the extracted side and outside the rotated display space area, for output,
wherein the drawing processor is configured to draw the label information, using one or more planes obtained by extending the boundary surface of the rotated display space area outward from the extracted side, as one or more label display planes.

2. The display control device according to claim 1, wherein the drawing processor determines a target on which the label information is to be drawn, from among the label display planes, on a basis of angles made by the label display planes with respect to a reference plane being parallel to the two-dimensional screen and including the extracted side.

3. The display control device according to claim 1, wherein the drawing processor excludes the label display plane orthogonal to the two-dimensional screen from a target at which the label information is to be drawn.

4. The display control device according to claim 1, wherein, in a case where an angle made by the label display plane with respect to a reference plane being parallel to the two-dimensional screen and including the extracted side falls outside a predetermined range when the display space area and the display object are rotated, the drawing processor draws the label information after rotating the label display plane about the extracted side by a predetermined angle.

5. The display control device according to claim 1, wherein, in a case where a displayed dimension of the label information falls outside a predetermined aspect ratio when the display space area and the display object are rotated, the drawing processor draws the label information after rotating the label display plane about the extracted side, thereby to cause the displayed dimension to have the aspect ratio.

6. A display control device comprising:
an instruction processor to provide an instruction for change of a display angle of a display space area that is a three-dimensional coordinate space in which a display object is displayed; and
a drawing processor to rotate and draw the display space area and the display object on a basis of the instruction received from the instruction processor, extract a side serving as a contour line of the rotated display space area displayed on a two-dimensional screen, from among sides that configure boundary surfaces of the rotated display space area, and draw label information at a position adjacent to the extracted side and outside the rotated display space area, for output,
wherein, in a case where two sides along a same coordinate axis of the three-dimensional coordinate space, among the sides that configure boundary surfaces of the rotated display space area, are sides that configure the contour line of the rotated display space area, the drawing processor extracts one of the two sides.

7. A display control device, comprising:
an instruction processor to provide an instruction for change of a display angle of a display space area that is a three-dimensional coordinate space in which a display object is displayed; and
a drawing processor to rotate and draw the display space area and the display object on a basis of the instruction received from the instruction processor, extract a side serving as a contour line of the rotated display space area displayed on a two-dimensional screen, from among sides that configure boundary surfaces of the rotated display space area, and draw label information at a position adjacent to the extracted side and outside the rotated display space area, for output,
wherein, in a case where display information other than the label info nation is displayed at a position where the label information is to be drawn when the display space area and the display object are rotated, the drawing processor excludes the position from a target at which the label information is to be drawn.

8. A display control device comprising:
an instruction processor to provide an instruction for change of a display angle of a display space area that is a three-dimensional coordinate space in which a display object is displayed; and
a drawing processor to rotate and draw the display space area and the display object on a basis of the instruction received from the instruction processor, extract a side serving as a contour line of the rotated display space area displayed on a two-dimensional screen, from among sides that configure boundary surfaces of the rotated display space area, and draw label information at a position adjacent to the extracted side and outside the rotated display space area, for output,
wherein, in a case where sides that configure the boundary surfaces of the rotated display space area overlap with one another as one group of sides that configure the contour line of the rotated display space area, the drawing processor extracts any one of the overlapping sides.

9. The display control device according to claim 1, wherein the display object is a data series of a graph.

10. A display system comprising:
an instruction processor to provide an instruction for change of a display angle of a display space area that is a three-dimensional coordinate space in which a display object is displayed;
a drawing processor to rotate and draw the display space area and the display object on a basis of the instruction received from the instruction processor, extract a side serving as a contour line of the rotated display space area displayed on a two-dimensional screen, from among sides that configure boundary surfaces of the rotated display space area, and draw label information at a position adjacent to the extracted side and outside the rotated display space area, for output; and
an output device to display drawing information output from the drawing processor,
wherein the drawing processor is configured to draw the label information, using one or more planes obtained by extending the boundary surface of the rotated display space area outward from the extracted side, as one or more label display planes.

11. A display method comprising:
in an instruction processor, providing an instruction for change of a display angle of a display space area that is a three-dimensional coordinate space in which a display object is displayed;

in a drawing processor, rotating and drawing the display space area and the display object on a basis of the instruction received from the instruction processor, extracting a side serving as a contour line of the rotated display space area displayed on a two-dimensional screen, from among sides that configure boundary surfaces of the rotated display space area, and drawing label information for output, at a position adjacent to the extracted side and outside the rotated display space area, using one or more planes obtained by extending the boundary surface of the rotated display space area outward from the extracted side, as one or more label display planes; and displaying, in an output device, drawing information output from the drawing processor.

12. A display control device comprising:

instruction processor circuitry configured to provide an instruction for change of a display angle of a display space area that is a three-dimensional coordinate space in which a display object is displayed; and drawing processor circuitry configured to rotate and draw the display space area and the display object on a basis of the instruction received from the instruction processor circuitry, extract a side serving as a contour line of the rotated display space area displayed on a two-dimensional screen, from among sides that configure boundary surfaces of the rotated display space area, and draw label information at a position adjacent to the extracted side and outside the rotated display space area, for output, wherein the drawing processor circuitry is configured to draw the label information, using one or more planes obtained by extending the boundary surface of the rotated display space area outward from the extracted side, as one or more label display planes.

* * * * *